United States Patent [19]
Saltzman

[11] Patent Number: 5,703,937
[45] Date of Patent: Dec. 30, 1997

[54] VOICE DICTATION CONSULTING SYSTEM AND METHOD

[75] Inventor: Jeremy Saltzman, Norwalk, Conn.

[73] Assignee: Dictahone Corporation, Stratford, Conn.

[21] Appl. No.: 606,092

[22] Filed: Feb. 23, 1996

Related U.S. Application Data

[63] Continuation of Ser. No. 370,957, Mar. 2, 1995, abandoned, which is a continuation of Ser. No. 124,678, Sep. 23, 1993, abandoned, which is a continuation of Ser. No. 723,022, Jun. 28, 1991, abandoned.

[51] Int. Cl.$^6$ .................................................. H04M 1/64
[52] U.S. Cl. .............................. 379/88; 379/201; 379/214
[58] Field of Search ............................ 379/67, 88, 89, 379/201, 211, 213, 214

[56] References Cited

U.S. PATENT DOCUMENTS

| | | | |
|---|---|---|---|
| 4,602,129 | 7/1986 | Matthews | 379/88 |
| 5,355,406 | 10/1994 | Chemicnski et al. | 379/88 |

OTHER PUBLICATIONS

"Introducing VMX works", VMX Inc., pp. 1-6, Apr. 1990.

Primary Examiner—Fan Tsang
Attorney, Agent, or Firm—Curtis Morris & Safford P.C.; Gregor N. Neff

[57] ABSTRACT

A voice processing system and method whereby communication can be established between two parties without direct, personal contact between the two. It is a system whereby a caller receives a reply to a question or problem even though the parties are unable to directly contact one another and are not part of the same dedicated telephone system. This is accomplished by receiving the call, recording the inquiry and giving the caller an identification number. The other party will access the recorded call, record a reply to such call and the system will store the response so as to be accessible by the initial caller upon use of the assigned identification number.

10 Claims, 4 Drawing Sheets

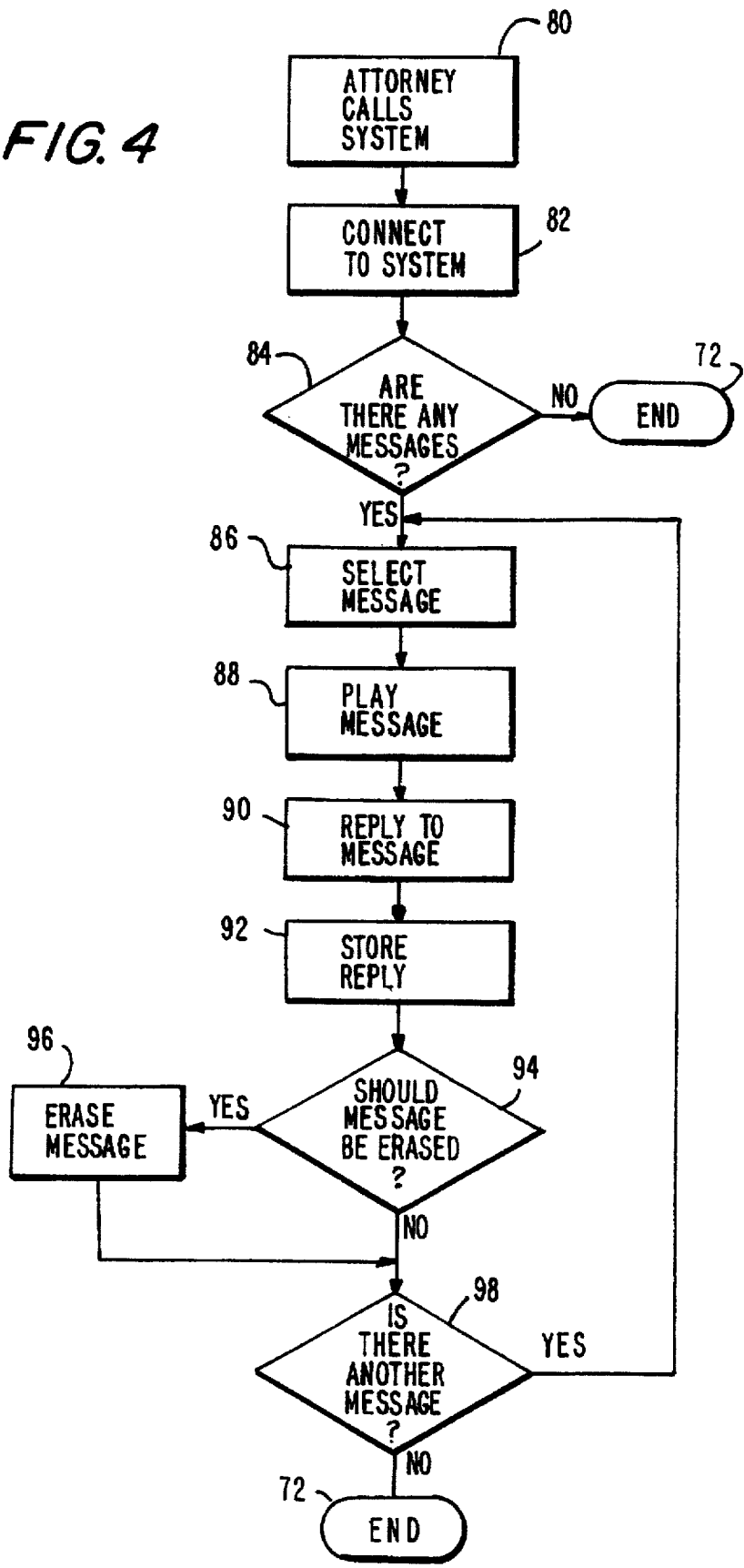

5,703,937

VOICE DICTATION CONSULTING SYSTEM AND METHOD

RELATED APPLICATIONS

This is a continuation of U.S. application Ser. No. 08/370,957, filed Mar. 2, 1995 (abandoned), which is a continuation of U.S. application Ser. No. 08/124,678, filed Sep. 23, 1993 (abandoned), which is a continuation of U.S. application Ser. No. 07/723,022, filed Jun. 28, 1991 (abandoned.)

BACKGROUND OF THE INVENTION

Telephone answering machines are now a common part of contemporary telephone usage. With telephone answering machines, the telephone machine has a prompt which is a recorded message to be given by the telephone subscriber to the caller. When the telephone subscriber is unable to answer an incoming call, the answering machine will play the prompt and the caller is directed to leave a message or is given other instructions. This message is then recorded by the telephone answering machine and the telephone subscriber will access the message at his convenience and can thereafter respond accordingly. Normally, the response is that of having the telephone subscriber return the telephone call.

There are also voice dictation systems wherein a caller will call the voice dictation system and leave a message that is subsequently transcribed so that a hard copy can be sent to the recipient of the message. In addition, there are voice mail systems where messages and replies can be recorded among those who are part of the system as in the case of a PBX system with voice mail as disclosed in copending U.S. application Ser. No. 07/138,417.

Although the above systems, and others like them, work well, each leaves something to be desired in terms of fast response on the part of the recipient of the message to a caller who is not part of the system. This is particularly true in the case of a professional responding to a client, patient, customer and the like. By professional is meant an individual such as an attorney, physician, accountant, stockbroker, and the like from whom a client, patient or customer seeks counsel, advice or information. With the present day telephone answering systems, it is often common for people to play "telephone tag" wherein each party continues to miss the other and a number of telephone messages are left. In addition, the original caller would be unable to receive the response to his inquiry unless he is located at a particular location. With regard to the voice dictation system, although it is advantageous for the professional to receive a hard copy of the message, it would be advantageous if the professional were able to give a response to a client without the need of each party having to be personally in touch with one another. As indicated previously, with a voice mail system, only the members of the voice mail system can leave messages and responses to one another.

SUMMARY OF THE INVENTION

A system and method have been devised whereby two parties, such as a professional and a client, are able to communicate with one another without direct contact between the two and without the parties being part of the same dedicated telephone systems such as a PBX telephone system. The client places a call to the professional's office. If the professional is not available immediately and the two are not able to enter into a direct conversation, the caller is given an option to become part of the professional's voice system at least until the matter to be transacted is concluded. Upon the client deciding to become part of the professional's voice system, he is connected to the system which then plays a prompt asking the client's name and telephone number. The telephone number can serve as an identification number or the client is given an identification number that allows him to be connected to the system. The client then asks his question or states his problem, which is recorded, and presses any designated key to end the transaction.

After the client's statement is complete, it is recorded in a voice file store which can be accessed by the professional. After listening to the inquiry, or problem, of the client, the professional responds to the inquiry and that response is recorded in the voice file store. Subsequent to such response, the client can call the system at any time from any location, give his identification number and receive the professional's recorded response.

BRIEF DESCRIPTION OF THE DRAWINGS

FIG. 4 is a flow chart representing the program for the professional responding to the client's recorded message.

DETAILED DESCRIPTION OF THE PREFERRED EMBODIMENT

Described is a system wherein one party such as an attorney, physician, accountant, stockbroker and the like is able to communicate with another party, such as a client, patient, customer and the like, without direct, personal contact between the two. For purposes of simplicity, the present invention will be described in terms of communication between a client and an attorney, but it will be understood that the principles herein are applicable to any relationship involving two individuals with a need to communicate with one another.

Figure 1:
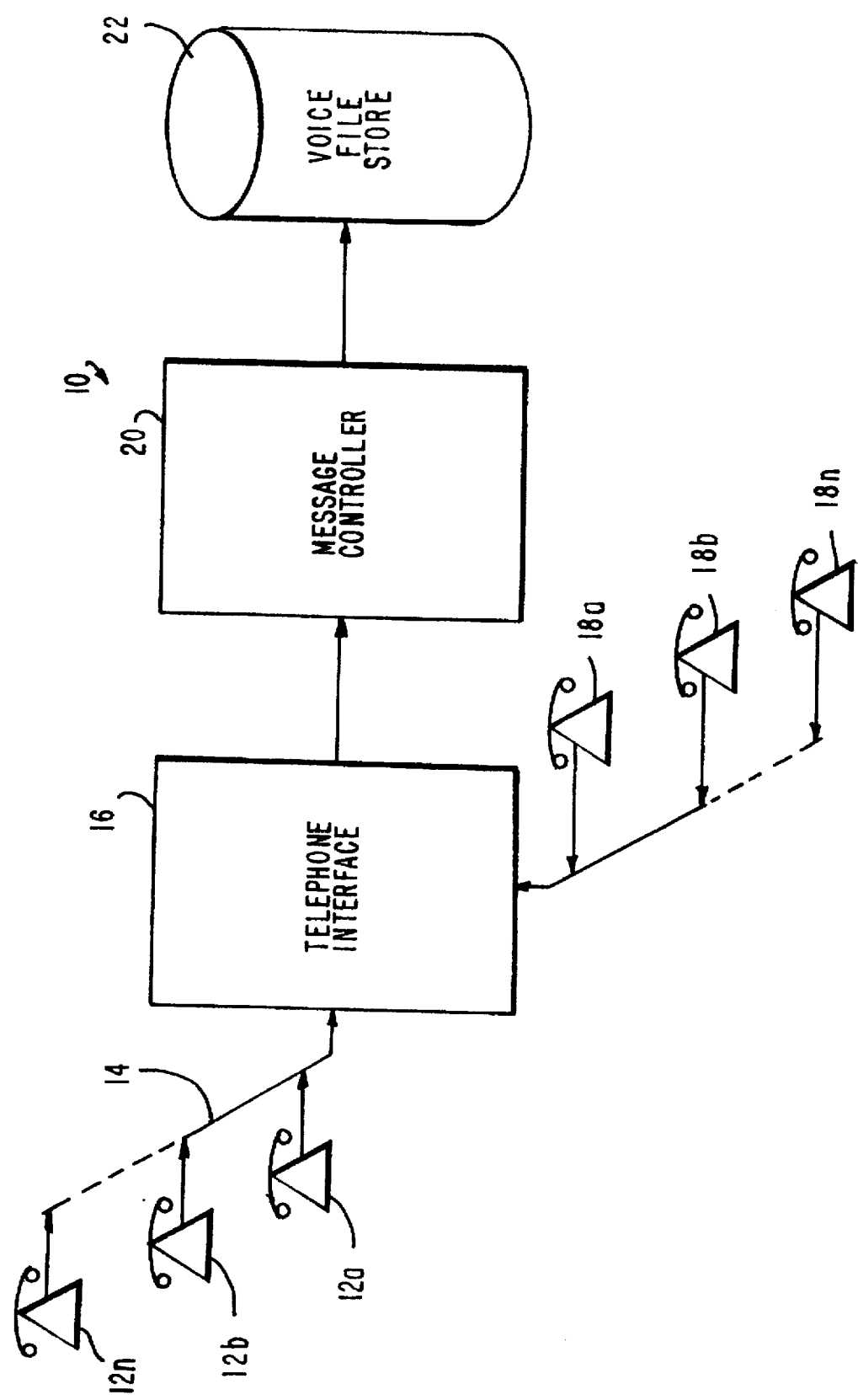
FIG. 1 is a block diagram representation of the system in which the instant invention can be practiced.

With reference to FIG. 1, a voice processing system that incorporates the instant invention is shown generally at 10. Private or business telephones 12a, 12b ... 12n can be used to communicate through telephone lines 14 with a telephone interface 16 of the voice processing system 10. The telephone interface 16 is in communication with in-house telephones 18a, ... 18n and a message controller 20. The message controller 20 in turn is in communication with a voice file store 22 which is a recording device that serve the purpose of recording messages from a client and responses from a professional.

Figure 2:
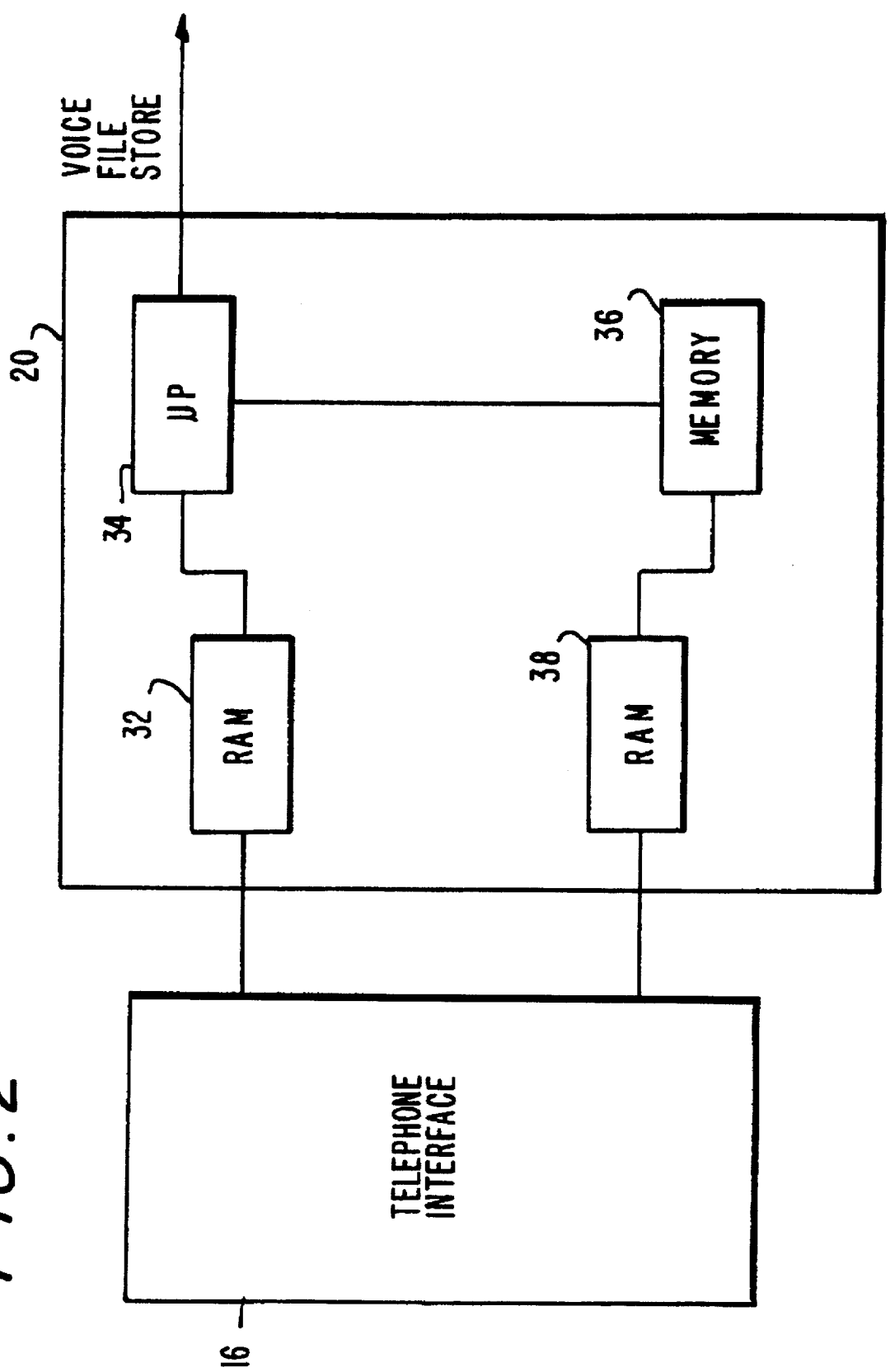
FIG. 2 is a block diagram showing details of the message controller shown in FIG. 1.

With reference to FIG. 2 the message controller 20 includes a RAM 32 which is in communication with the telephone interface 16 and a microprocessor 34, the RAM acting as a buffer between the two. The microprocessor 34 is in communication with the voice file store 22 and with a memory 36. The memory 36 is in communication with another RAM 38 that is in communication with the telephone interface 26, again the RAM 38 acting as a buffer.

What has been shown and described with reference to FIGS. 1 and 2 is a system 10 of the type that is well known in the art and for that reason has not been described in great detail. Systems of this general type are described, for example, in U.S. Pat. Nos. 4,853,952; 4,860,339; 4,922,514 and 5,003,575.

In operation, the telephone interface 16 receives incoming calls from telephones 12a, 12b - - - 12n and forwards the incoming calls to the appropriate internal telephones 18a, 18b ... 18n and to the microprocessor 34 of the message controller 20 by way of the RAM 32. The RAM 32 serves as a buffer for incoming messages to assure that the incoming messages are handled at a rate that does not exceed the through-put of the microprocessor 34. If the called phone is answered, communication with the microprocessor is terminated. If the internal telephone 18 is not answered after a predetermined number of rings, the microprocessor 34 will cause a prompt which is stored in the memory 36 to be played asking the caller if he wishes to use the services of the system 10. The RAM 38 also serves as a buffer, but between the memory 36 and the telephone interface 16. The message is forwarded to the caller and the routine is ended if the caller does not wish to use the system's 10 services. If the caller does wish to use the services, he is given an identification number and his message is received by the RAM 32 where it is temporarily stored as required until the message is received by the microprocessor 34. The microprocessor 34 knows the memory storage allocation in the voice file store 22 and will determine where the new message is to be stored.

Upon the message being stored in the voice file store 22, the microprocessor 34 will communicate this to the telephone interface which will communicate to the caller that the message has been stored. In addition to receiving an outside call, the telephone interface 16 also forwards calls from the attorney to the message controller 20 whereby, upon proper identification, the microprocessor 34 causes the caller's message in the voice message file to be heard by the attorney. The message would be received by the microprocessor 34 from the voice file store 22 and forwarded to the appropriate telephone 18 of the attorney so that the attorney can hear the message from the client.

Upon hearing the message from the client, the attorney will then send a reply over one of the telephones 18a, 18b ... 18n, which will be received by the microprocessor 34 and stored in voice file store 22 with the callers identification number. Subsequently, the client will call the system 10 giving his identification number. Upon recognition of the identification number by the microprocessor 34, the attorney's reply will be retrieved from the memory 36 and the reply forwarded back to the microprocessor 34 to be received by the client's telephone 12.

Figure 3:
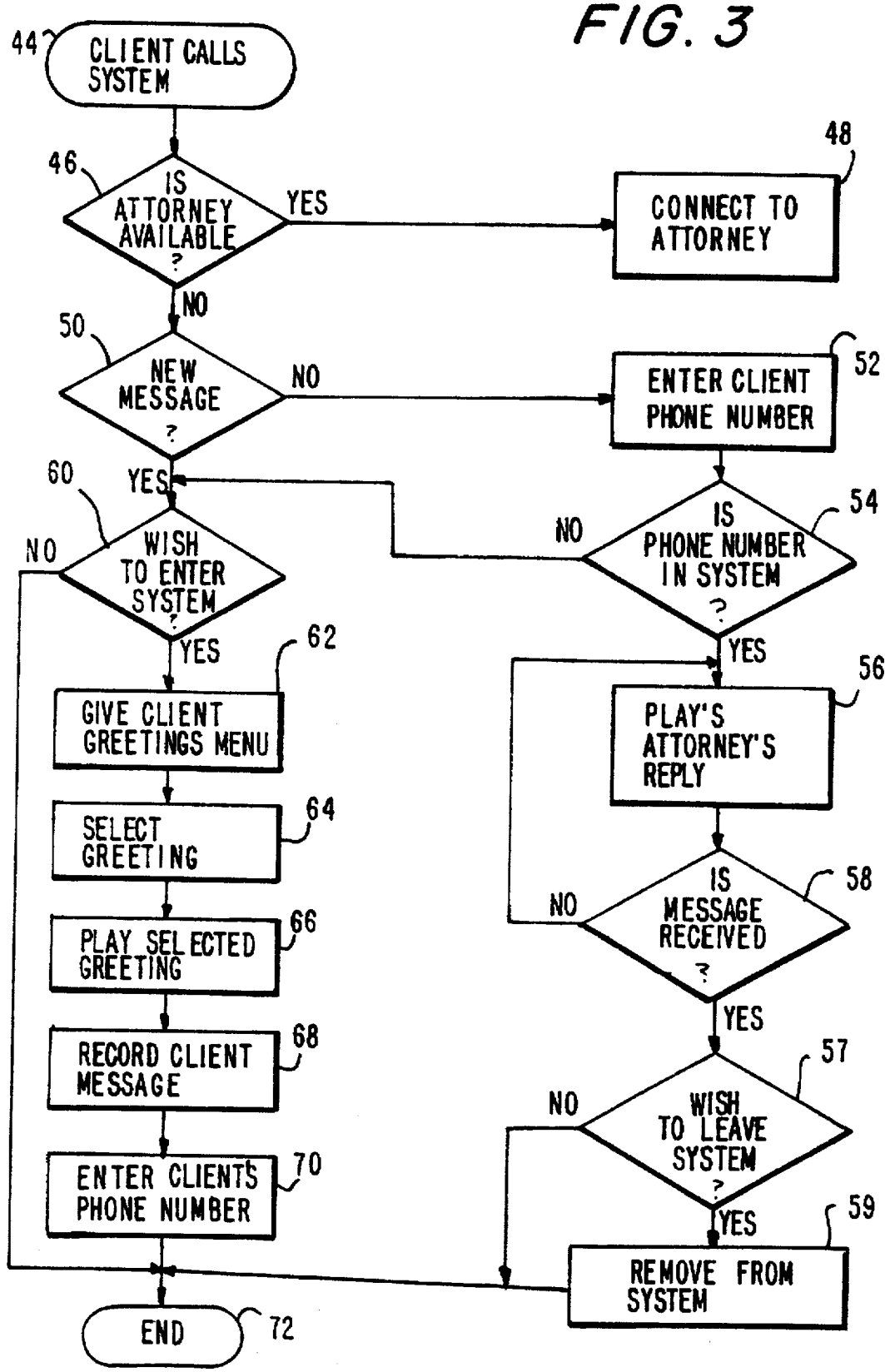
FIG. 3 is a flow chart representative of the program for entering a client's call into the system and allowing the client to receive a professional's response.

Referring now to FIG. 3 the system will be described in terms of steps taken during the receipt of a client's call. Initially, the client calls the system 44 and a determination is made whether the attorney is available 46. If the attorney is available, he is connected to the client 48 and the communication between them is carried out. If the attorney is not available, the question is asked as to whether the incoming call represents a new message 50. If it is not a new message, the client enters 52 his phone number or an identification number which could be his social security number, birth date, or any other number that uniquely identifies the caller. As an alternative, an identification number can be given to the client by the system 10 or the identification number can be a composite of unique numbers. An inquiry is made whether that phone number or identification number is in the system 54. If the number is stored in the system, the attorney's reply is played 56. Then the question is asked whether the message is received 58. If the message is not received, the attorney's reply is replayed but if the message is received the client is asked if he wishes to leave the system 57. If not, the routine is terminated 72. If so, the identification number is removed from the system 59 and the routine is terminated 72.

If the client's phone number, or identification number, is not in the system, an inquiry is made whether the client wishes to enter the system 60. If the client does not wish to enter the system the routine is terminated 72. If the client wishes to enter the system, the client is given a greetings menu 62 wherein instructions are given to the client as to how to leave a message and a selection of the available attorneys is also given. The client selects the greetings 64 and the greeting is played 66. Thereafter, the client gives a message which is recorded 68 and stored in the voice file store 22. The client's phone number is entered 70 for the purpose of identifying the client on subsequent calls, after which the routine is terminated 72.

With reference now to FIG. 4, the routine for the response to the client's question or problem will be described. The attorney calls the system 80 and is connected to the system 82. An inquiry is made whether there are any messages 84. If there are no messages, the routine is terminated 72. If there are messages, the attorney selects a message and the system will play the selected message 86. The attorney will then reply to the message 90 and this reply is stored 92 in the voice file store 22. An inquiry is then made as to whether the message should be erased 94. If the answer is "yes" the message is erased 96. After the message is erased 96, or if the answer is "no", an inquiry is made whether there is another message and, if there is, the routine is repeated for selecting a message 86. If there is no other message, the routine is terminated 72.

Thus, what has been shown and described is an apparatus and method whereby a client can ask an opinion and receive a response from an attorney without there being direct contact. The advantage of this system over contemporary systems, such as telephone answering machines, is that the attorney can respond to a large number of inquiries by clients without having to dial each client to see if the client is available. This process saves time for both the attorney and the client. Clearly, requiring direct contact with each client who has a specific question is time consuming and the present invention overcomes the inefficiency that accompanies such a procedure.

What is claimed is:

1. A voice processing system, comprising:
   an interface device for receiving incoming calls from callers not associated with said voice processing system and for receiving calls from professionals who are associated with said voice processing system and who are provided with voice mail storage;
   a voice storage device for storing message from said callers and for storing response messages from said professionals; and
   a message controller coupled to said interface device and said voice storage device for receiving from a caller during an initial call a selection of one of a plurality of professionals, controlling said voice storage device to store a message supplied, by said caller during said initial call, for a selected professional and assigning a unique identification code to said stored message; said controller being adapted to supply said stored message to the selected professional and control said voice storage device to store a response message from the selected professional; and said controller being adapted to supply said stored response message to said caller, during a subsequent call by said caller to the selected professional, if the selected professional is unavailable to receive said subsequent call and the caller supplies said unique identification code to said voice processing system during said subsequent call; and wherein said subsequent call occurs after said initial call.

2. The voice processing system of claim 1, wherein said message controller is adapted to provide said caller with said identification code when said caller supplies the message.

3. The voice processing system of claim 1, wherein said message controller is operable to prompt said caller to provide the unique identification code when said caller supplies the message and for assigning the caller supplied identification code to said stored message.

4. The voice processing system of claim 1, wherein said message controller is operable to erase the identification code from said voice storage device when the stored response message is supplied to said caller.

5. The voice processing system of claim 1, wherein each of said professionals can supply a response message only to stored messages intended for a respective professional.

6. A method of processing messages in a voice processing system, comprising the steps of:

receiving a first incoming call from a caller not associated with said voice processing system;

receiving from said caller during said first incoming call a selection of one of a plurality of professionals;

prompting said caller to leave a message for a selected professional, each of said professionals being associated with said voice processing system and being provided with voice mail storage capability;

receiving and storing a message from said caller;

assigning a unique identification code to said message;

supplying said stored message to the selected professional;

receiving and storing a response message from the selected professional;

assigning said identification code of said message to said stored response message;

receiving a second incoming call, after said first incoming call, for the selected professional from said caller;

receiving a second identification code from said caller when the selected professional is unavailable to receive the second incoming call; and supplying said stored response message to said caller when said second identification code matches said identification code assigned to said stored response message.

7. The method of claim 6, further comprising the step of providing said identification code to said caller when said caller supplies the message.

8. The method of claim 6, further comprising the steps of prompting said caller to provide the unique identification code when said caller supplies the message and assigning the caller supplied identification code to said stored message.

9. The method of claim 6, further comprising the step of removing the identification code from the stored message and response message when the stored response message is supplied to said caller.

10. The method of claim 6, wherein each of said professionals can supply a response message only to stored messages intended for a respective professional.

\* \* \* \* \*

UNITED STATES PATENT AND TRADEMARK OFFICE
CERTIFICATE OF CORRECTION

PATENT NO.   : 5,703,937
DATED        : Dec. 30, 1997
INVENTOR(S)  : Jeremy Saltzman It is certified that error appears in the above-identified patent and that said Letters Patent is hereby corrected as shown below:

On the title page, item [73], Assignee, change "Dictahone Cororation" to

--Dictaphone Corporation--.

Signed and Sealed this

Twenty-fourth Day of November, 1998

Attest:

BRUCE LEHMAN

Attesting Officer

*Commissioner of Patents and Trademarks*